United States Patent
Aamir et al.

(10) Patent No.: US 12,285,736 B1
(45) Date of Patent: Apr. 29, 2025

(54) DEGRADATION OF HEXACHLOROCYCLOHEXANE FROM SOIL WITH STEAM ACTIVATED BIOCHAR

(71) Applicant: KING FAISAL UNIVERSITY, Al-Ahsa (SA)

(72) Inventors: Muhammad Aamir, Al-Ahsa (SA); Muhammad Hassan, Al-Ahsa (SA); Faisal Haroon, Al-Ahsa (SA)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 18/444,580

(22) Filed: Feb. 16, 2024

(51) Int. Cl.
| | |
|---|---|
| C01B 13/11 | (2006.01) |
| B01J 20/20 | (2006.01) |
| B01J 20/28 | (2006.01) |
| B01J 20/30 | (2006.01) |
| B09C 1/08 | (2006.01) |
| C01B 32/318 | (2017.01) |
| C01B 32/336 | (2017.01) |

(52) U.S. Cl.
CPC ......... *B01J 20/20* (2013.01); *B01J 20/28059* (2013.01); *B01J 20/3078* (2013.01); *B01J 20/3085* (2013.01); *B09C 1/08* (2013.01); *C01B 32/318* (2017.08); *C01B 32/336* (2017.08); *C01P 2006/12* (2013.01)

(58) Field of Classification Search
CPC ..... C10B 57/045; C10B 57/005; C10B 53/02; C05F 11/02; B01J 19/088; B01J 8/44; B01J 19/10; B01J 2219/0286; B01J 2219/0254; B01J 2219/0295; B01J 2219/0879; B01J 2219/00063; B01J 2219/00067; B01J 20/20; B01J 20/28059; B01J 23/3078; B01J 20/3085; C05B 17/00; C01B 13/11; C01B 2201/62; C01B 2201/12; C01B 2201/80; C01B 32/318; C01B 32/336; C05G 3/44; B09C 1/08; C01P 2006/12

See application file for complete search history.

(56) References Cited

U.S. PATENT DOCUMENTS

| | | | |
|---|---|---|---|
| 10,023,503 B2 * | 7/2018 | Bontchev | C10B 53/02 |
| 10,252,951 B2 * | 4/2019 | Bontchev | C05G 3/80 |
| 2011/0258914 A1 * | 10/2011 | Banasiak | C10K 1/02 44/605 |
| 2014/0162873 A1 * | 6/2014 | Gu | B01J 35/647 423/460 |

(Continued)

FOREIGN PATENT DOCUMENTS

| | | |
|---|---|---|
| CN | 113578955 A | 5/2022 |
| KR | 102015327 B1 | 8/2019 |

OTHER PUBLICATIONS

Amirvekov et al ("HCH Removal in a Biochar-Amended Biofilter"; Dec. 2021; URL: https://www.researchgate.net/publication/356722583_HCH_Removal_in_a_Biochar-Amended_Biofilter) (Year: 2021).*

(Continued)

*Primary Examiner* — Edwin J Toledo-Duran
(74) *Attorney, Agent, or Firm* — Nath, Goldberg & Meyer; Joshua B. Goldberg

(57) ABSTRACT

The present subject matter relates to a steam activated biochar, a method of preparing the steam activated biochar, and a method of removing hexachlorocyclohexane (HCH) from soil using the steam activated biochar.

12 Claims, 2 Drawing Sheets

Production of biochar through pyrolysis

(56) References Cited

U.S. PATENT DOCUMENTS

| | | | | |
|---|---|---|---|---|
| 2019/0002764 A1* | 1/2019 | Lee | ............... | C10B 57/045 |
| 2019/0367814 A1* | 12/2019 | Brandhorst, Jr. | ........ | C08J 11/14 |
| 2021/0198162 A1* | 7/2021 | Lee | ............... | C05F 11/02 |
| 2021/0222071 A1* | 7/2021 | Zitomer | ............ | B01J 21/18 |
| 2022/0181607 A1* | 6/2022 | Belmont | ............ | H01M 4/364 |

OTHER PUBLICATIONS

Gao et al; "Remediation of soil contaminated with PAHs and γ-HCH using Fenton oxidation activated by carboxymethyl cellulose-modified iron oxide-biochar"; Apr. 2023; URL: https://www.sciencedirect.com/science/article/pii/S0304389423007331 (Year: 2023).*

Min Zhu, et al., Compound-specific stable isotope analysis for characterization of the transformation of γ-HCH induced by biochar, DOI : https://doi.org/10.1016/j.chemosphere.2022.137729.

Irina Gabriela Cara, et al., Biochar a Promising Strategy for Pesticide-Contaminated Soils, DOI: https://doi.org/10.3390/agriculture12101579.

Ludovica Silvani, et al., Sorption of α-, β-, γ- and δ-hexachlorocyclohexane isomers to three widely different biochars: Sorption mechanisms and application, DOI : https://doi.org/10.1016/j.chemosphere.2018.12.070.

Gopinath Halder, et al., Fluoride Sorption onto a Steam-Activated Biochar Derived From Cocos nucifera Shell, DOI: https://doi.org/10.1002/clen.201400649.

Taeyong Shim et al., Effect of steam activation of biochar produced from a giant Miscanthus on copper sorption and toxicity, DOI: https://doi.org/10.1016/j.biortech.2015.08.055.

* cited by examiner

Production of biochar through pyrolysis

DEGRADATION OF HEXACHLOROCYCLOHEXANE FROM SOIL WITH STEAM ACTIVATED BIOCHAR

BACKGROUND

1. Field

The disclosure of the present patent application relates to a method of removing hexachlorocyclohexane (HCH) from soil and, particularly, a method for degrading hexachlorocyclohexane from soil using steam activated biochar.

2. Description of the Related Art

Hexachlorocyclohexane (HCH) is widely utilized in the agriculture sector as a pesticide which can increase crop productivity. However, its utilization also causes severe consequences on the environment and soil health, killing the soil microorganisms which provide porosity to the soil. HCH is also known as a persistent organic pollutant (POPs) which is very difficult to eliminate once applied even only once. It also can contaminate freshwater resources and ground water resources which has continual impacts on livestock and public health. Therefore, the removal of HCH from the soil is very important for a cleaner environment.

Thus, a new solution solving the above problems is desired.

SUMMARY

Biochar is a rich organic matter which can be prepared from corn stover. Corn stover includes leaves, stalks, and cobs of corn plants left in a field after harvest. Corn stover is an abundant agricultural resource available worldwide. The biochar as described herein can be produced using pyrolysis at a temperature of at least about 500° C. while nitrogen can be utilized as a carrier gas. The prepared biochar is first oven dried at a temperature of at least about 105° C. for about 24 hours to completely dry it. The dried biochar can then be exposed to steam produced at about 320° C. for about 2 hours for activation purposes. The steam modification of the biochar works as an oxidizing agent to remove HCH from soil. The steam modification of biochar increased the porosity of the biochar from 42 to 73 $m^2/gram$ as measured through the Bruner Emitter Teller (BET) technique. Steam activation may reduce the hydrophobicity and may enhance the polarity of the biochar surface, enabling it to provide a higher adsorbent rate for HCH removal with less reaction time.

Accordingly, in an embodiment, the present subject matter relates to a steam activated biochar, the biochar prepared through the following method: using pyrolysis to process corn stover to obtain biochar; drying the biochar; steam activating the biochar in an autoclave; and obtaining steam activated biochar.

The present subject matter relates to a method of removing hexachlorocyclohexane (HCH) using steam activated biochar, the method comprising: adding 6% by weight of the steam activated biochar to soil contaminated with the HCH to remove HCH from the soil.

These and other features of the present subject matter will become readily apparent upon further review of the following specification.

DETAILED DESCRIPTION OF THE PREFERRED EMBODIMENTS

Figure 1:
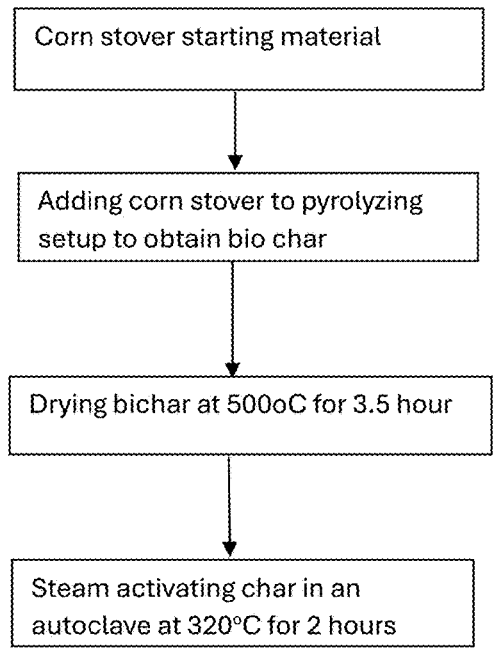
FIG. 1 shows a flowchart for a method of preparing biochar according to an embodiment as described herein.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not. For example, "optionally substituted alkyl" means either "alkyl" or "substituted alkyl," as defined herein.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

Figure 2:
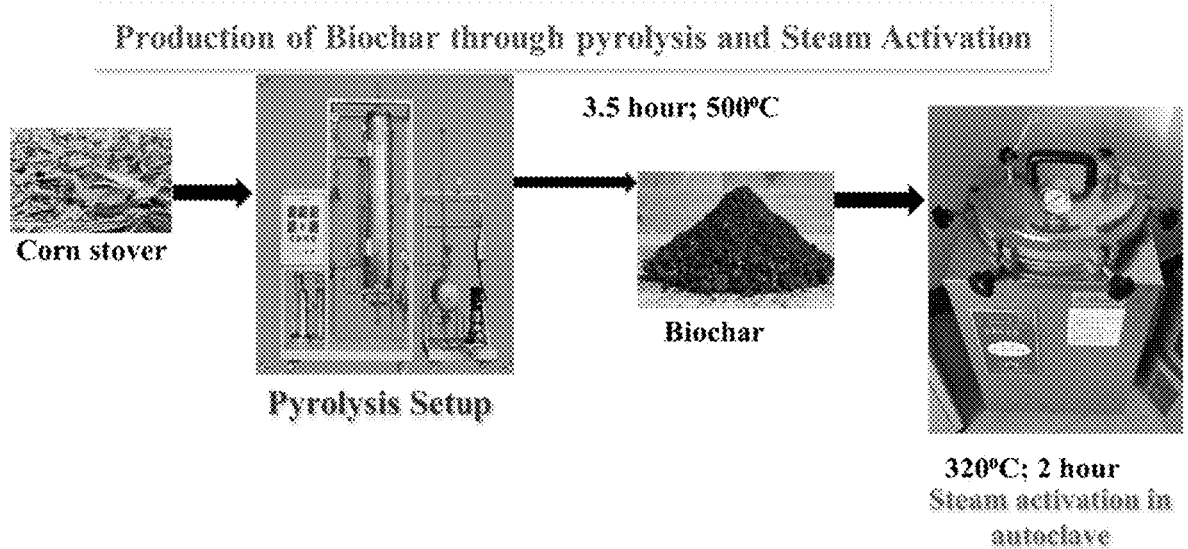
FIG. 2 shows photos illustrating a method of preparing biochar according to an embodiment of a method as described herein.

Biochar is a rich organic matter which can be prepared from corn stover as illustrated In FIGS. 1 and 2. As illustrated in FIG. 2, corn stover includes leaves, stalks, and cobs of corn plants left in a field after harvest. Corn stover is an abundant agricultural resource available worldwide. The biochar as described herein can be produced using pyrolysis at a temperature of at least about 500° C. while nitrogen can be utilized as a carrier gas. The prepared biochar is first oven dried at a temperature of at least about 105° C. for about 24 hours to completely dry it. The dried biochar can then be exposed to steam produced at about 320° C. for about 2 hours for activation purposes. The steam modification of the biochar works as an oxidizing agent to remove HCH from soil. The steam modification of biochar increased the porosity of the biochar from 42 to 73 $m^2$/gram as measured through the Bruner Emitter Teller (BET) technique. Steam activation may reduce the hydrophobicity and may enhance the polarity of the biochar surface, enabling it to provide a higher adsorbent rate for HCH removal with less reaction time.

Accordingly, in an embodiment, the present subject matter relates to a steam activated biochar, the biochar prepared through the following method: using pyrolysis to process corn stover to obtain biochar; drying the biochar; steam activating the biochar in an autoclave; and obtaining steam activated biochar.

In an embodiment of the present subject matter, the corn stover may be pyrolyzed at about 500° C.

In another embodiment of the present subject matter, nitrogen gas may be used as a carrier gas in the pyrolysis process.

In a further embodiment, the can be heated at about 105° C.

In an embodiment, the biochar may be heated for about 24 hours.

In another embodiment, the biochar may be steam activated in the autoclave at 320° C.

In a further embodiment, the biochar may be steam activated in the autoclave for about 2 hours.

In an embodiment, the steam activated biochar may have a porosity of 73 $m^2$/gram.

In another embodiment, a porosity of the biochar is increased from 42 $m^2$/gram to 73 $m^2$/gram after steam activating in the autoclave.

Figure 3:
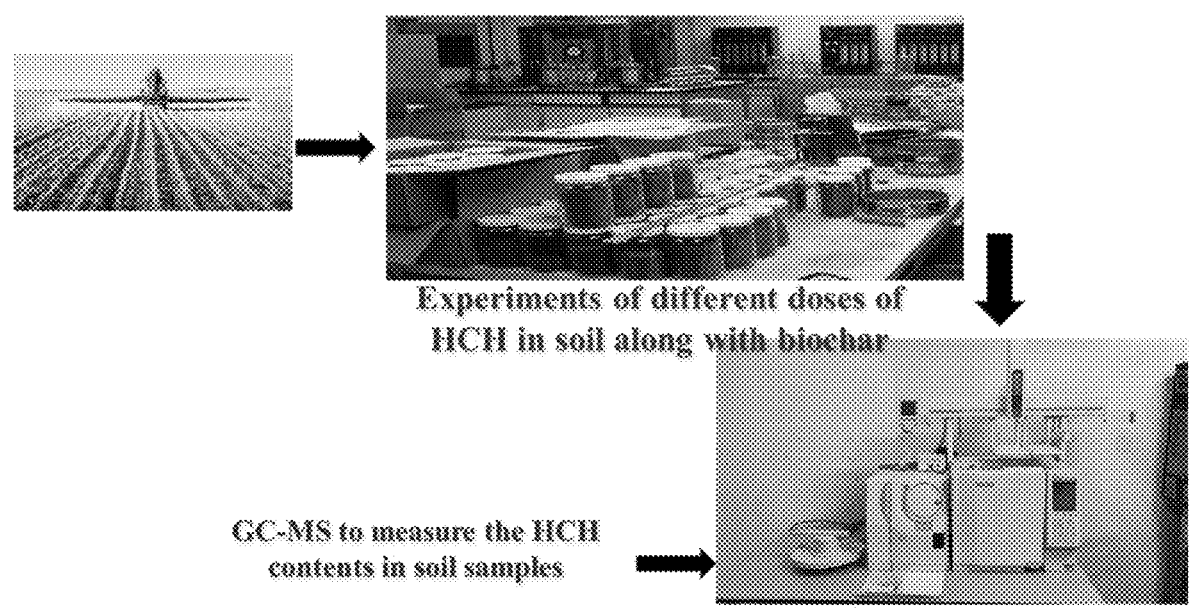
FIG. 3 shows photos illustrating a method of removing HCH from soil according to an embodiment of a method as described herein.

In an embodiment, the present subject matter relates to a method of removing hexachlorocyclohexane (HCH) using steam activated biochar, the method comprising: adding 6% by weight of the steam activated biochar to soil contaminated with the HCH to remove HCH from the soil. An implementation of the method of removing HCH from soil is illustrated in FIG. 3.

In an embodiment of the present methods for removing HCH, a concentration of the HCH removed from the soil is selected from a group consisting of about 0.4 mL HCH per kg soil, about 0.6 mL HCH per kg soil, about 0.8 mL HCH per kg soil, about 1.0 mL HCH per kg soil, about 1.2 mL HCH per kg soil, and about 1.4 mL HCH per kg soil. In this regard, the present methods can remove about 0.4 mL HCH per kg soil to about 1.4 mL HCH per kg soil.

In another embodiment of the present methods for removing HCH, a percentage of removal of HCH from the soil is selected from a group consisting of about 81% of the HCH, about 78% of the HCH, about 71% of the HCH, about 58% of the HCH, about 52% of the HCH, about 46% of the HCH, and about 32% of the HCH. In this regard, the present methods can remove about 32% to about 81% of HCH present in a soil sample.

In a further embodiment of the present methods, the method may further comprise mixing the steam activated biochar homogeneously into the soil.

The following examples illustrate the present teachings.

EXAMPLE 1

Method for Preparing Steam Activated Biochar

The biochar is produced at 500° C. using pyrolysis using nitrogen as a carrier gas. The prepared biochar was first oven dried at 105° C. for 24 hours to completely dry it. The dried biochar was further exposed to steam produced at 320° C. for 2 hours in an autoclave to activate the biochar. The steam modification of the biochar acts as an oxidizing agent, thereby enhancing the ability of the biochar to remove HCH from soil. The steam modification of biochar increased the porosity of the biochar from 42 $m^2$/gram to 73 $m^2$/gram as measured through Bruner Emitter Teller (BET) technique. Steam activation reduced the hydrophobicity and enhanced the polarity of the biochar surface enabling it to provide a higher adsorbent rate for HCH removal with less reaction time.

EXAMPLE 2

Method for Removing Hexachlorocyclohexane (HCH) from Soil Using the Steam Activated Biochar Six percent (6%) of steam activated biochar (SAB) was added in the soil for all samples on a weight basis. For example, 6 grams of biochar was added to each 100 grams of loam soil. The HCH was sprayed on the soil samples containing 6% SAB in different treatments. For example, the concentrations include 0.2 mL of HCH per 1 kg soil sample; 0.4 mL of HCH per 1 kg soil sample; 0.6 mL of HCH per 1 kg soil sample; 0.8 mL of HCH per 1 kg soil sample; 1.0 mL of HCH per 1 kg soil sample; 1.2 mL of HCH per 1 kg soil sample; and 1.4 mL of HCH per 1 kg soil sample.

It was found that the higher concentration of the HCH proved very toxic and very difficult to eliminate. The lower concentration of the HCH was well catered for by the SAB and their absorbances of HCH was measured up to 81% at the concentration 0.2 mL/kg soil sample. The HCH absorbance of the other concentrations were 78%, 71%, 58%, 52%, 46%, 32% for the HCH concentration of 0.4 mL/kg soil sample; 0.6 mL/kg soil sample; 0.8 mL/kg soil sample; 1.0 mL/kg soil sample; 1.2 mL/kg soil sample; 1.4 mL/kg soil sample respectively as compared with the control treatment (soil sample with zero contents of biochar).

Experiments were also conducted with only biochar that was not steam activated, which provided about 20% less HCH removal efficiency as compared with the HCH removal efficiency of SAB at the similar HCH concentration levels. The HCH absorbance level of the SAB decreased as the HCH concentration rose. The SAB addition enhanced the soil cation and anion exchange capacity and enabled it to handle higher contaminations including HCH. The SAB also improved the soil health and soil structure. The HCH contents in the soil were measured by the standard prescribed methods of mass spectrometry. The addition of SAB is recommended for soils which are exposed to HCH to reduce its environmental carcinogenic impacts. The SAB as described herein is cost effective to produce and has high commercial benefits in removing other persistent organic pollutants (POPs) and pesticides applied on soil for agricultural activities.

It is to be understood that the steam activated biochar and method for removing hexachlorocyclohexane (HCH) using the steam activated biochar described herein is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of removing hexachlorocyclohexane (HCH) from soil using a steam activated biochar, the method comprising
   pyrolyzing corn stover to obtain the biochar;
   drying the biochar at a drying temperature;
   steam activating the biochar in an autoclave at a temperature higher than the drying temperature;
   adding 6% by weight of the steam activated biochar to soil contaminated with the HCH; and
   removing the HCH from the soil;
   wherein the biochar acts as an oxidizing agent in the soil.

2. The steam activated biochar of claim 1, wherein the corn stover is pyrolyzed at about 500° C.

3. The steam activated biochar of claim 1, wherein nitrogen gas is used as a carrier gas in the pyrolysis process.

4. The steam activated biochar of claim 1, wherein the biochar is dried by heating the biochar at about 105° C.

5. The steam activated biochar of claim 4, wherein the biochar is heated for about 24 hours.

6. The steam activated biochar of claim 1, wherein the biochar is steam activated in the autoclave at about 320° C.

7. The steam activated biochar of claim 6, wherein the biochar is steam activated in the autoclave for about 2 hours.

8. The steam activated biochar of claim 1, wherein the steam activated biochar has a porosity of 73 $m^2$/gram.

9. The steam activated biochar of claim 1, wherein a porosity of the biochar is increased from 42 $m^2$/gram to 73 $m^2$/gram after steam activating in the autoclave.

10. The method of claim 1, wherein a concentration of the HCH is selected from a group consisting of 0.4 mL HCH per kg soil, 0.6 mL HCH per kg soil, 0.8 mL HCH per kg soil, 1.0 mL HCH per kg soil, about 1.2 mL HCH per kg soil, and about 1.4 mL HCH per kg soil.

11. The method of claim 1, wherein a percentage of removal of HCH is selected from a group consisting of about 81% of the HCH, about 78% of the HCH, about 71% of the HCH, about 58% of the HCH, about 52% of the HCH, about 46% of the HCH, and about 32% of the HCH.

12. The method of claim 1, further comprising mixing the steam activated biochar homogeneously into the soil.

* * * * *